Dec. 12, 1950          F. J. LEE          2,533,823
FIRE HOSE SUPPORT

Filed June 10, 1948          3 Sheets-Sheet 1

INVENTOR.
FLOYD J. LEE.
BY *Richey & Watts*
ATTORNEYS.

Dec. 12, 1950 F. J. LEE 2,533,823
FIRE HOSE SUPPORT

Filed June 10, 1948 3 Sheets-Sheet 2

INVENTOR.
FLOYD J. LEE.
BY
Richey & Watts
ATTORNEYS.

Dec. 12, 1950  F. J. LEE  2,533,823
FIRE HOSE SUPPORT
Filed June 10, 1948  3 Sheets-Sheet 3
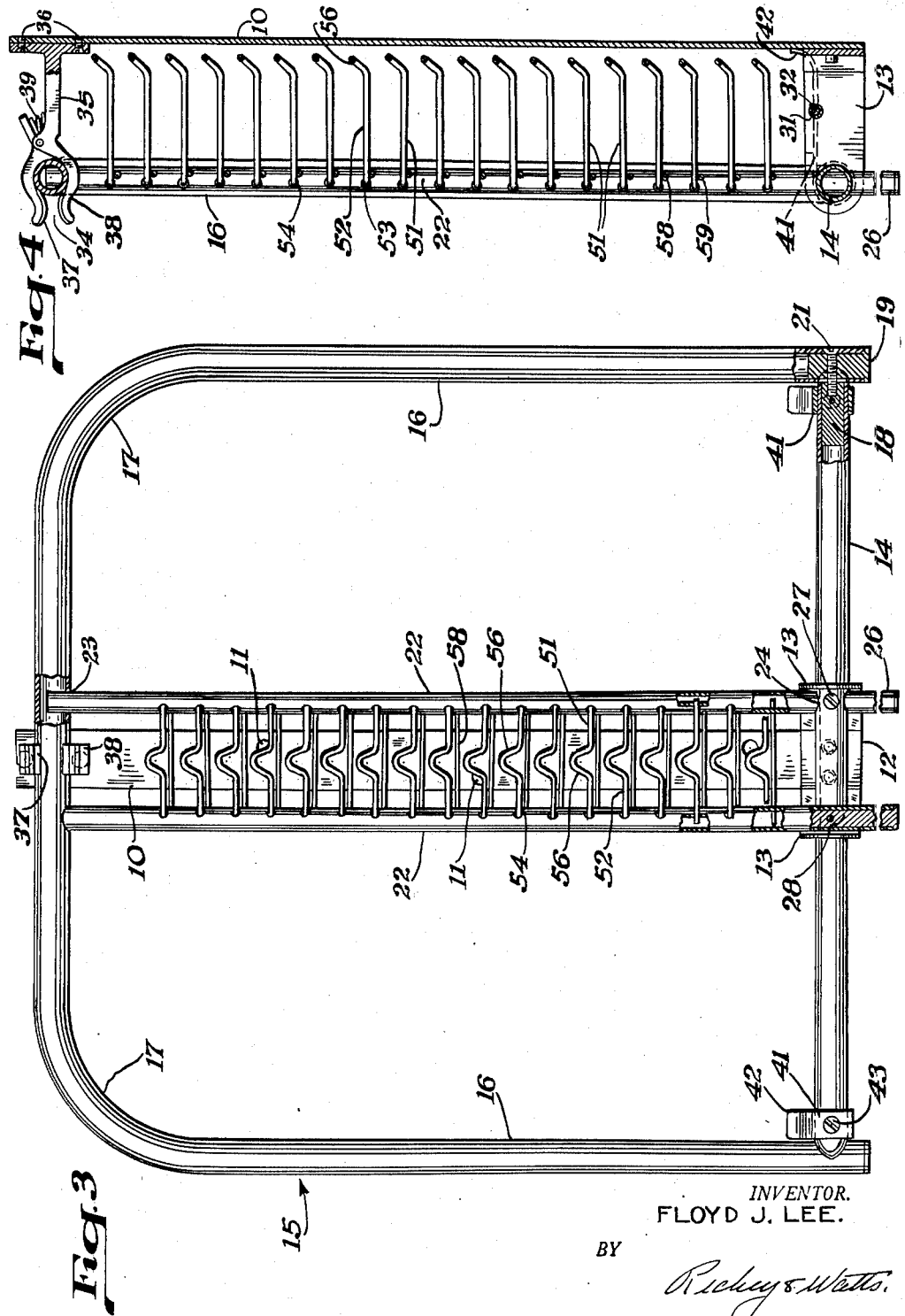
INVENTOR.
FLOYD J. LEE.
BY
Richey & Watts
ATTORNEYS.

Patented Dec. 12, 1950

2,533,823

UNITED STATES PATENT OFFICE 2,533,823

FIRE HOSE SUPPORT

Floyd J. Lee, Fullerton, Calif., assignor to Akron Brass Mfg. Company, Inc., Wooster, Ohio, a corporation of Ohio Application June 10, 1948, Serial No. 32,213

7 Claims. (Cl. 248—89)

This invention relates to fire hose supports and is particularly directed to improvements in wall brackets for holding lengths of fire hose in readiness for immediate use.

Numerous instrumentalities have been proposed from time to time to facilitate the stowage of lengths of fire hose in a compact, orderly manner, and with a view of minimizing the time required to put the hose into service in an emergency. Such instrumentalities, however, have all been found inadequate, due largely to latent defects which are overcome by the present invention.

Previously known hose supports or racks possess several inherent weaknesses. One of the defects is the tendency of the hose to become entwined during the removal thereof from the rack. Another defect resides in the deleterious effects of the load imposed upon bends or folds in the hose and a still further defect results from the intimate engagement of the portions of the hose between the folds and the consequent susceptibility thereof to mildew and rot.

The principal objects of the present invention are:

To support a hose in such a manner that it may be removed with expedition and dispatch without tangling.

To support the hose in such a manner that there is substantially no weight upon the folded portions thereof.

To support the hose so that the convolutions thereof are separated and ventilated.

To support the hose so that it may be easily inspected.

Other objects of the invention contemplate the racking of a length of hose in a manner that will attain a neat and pleasing appearance; the provision of a hose rack which is strong, durable, and economical; and the provision of a rack that may be readily adjusted for emergency use.

The realization of the foregoing objects and advantages of the invention will be apparent to those skilled in the art from the appended description.

Referring to the drawings:

Figs. 3 and 4 are elevation views, partially in section, of the support in its normal closed position with the hose removed.

Figure 1:
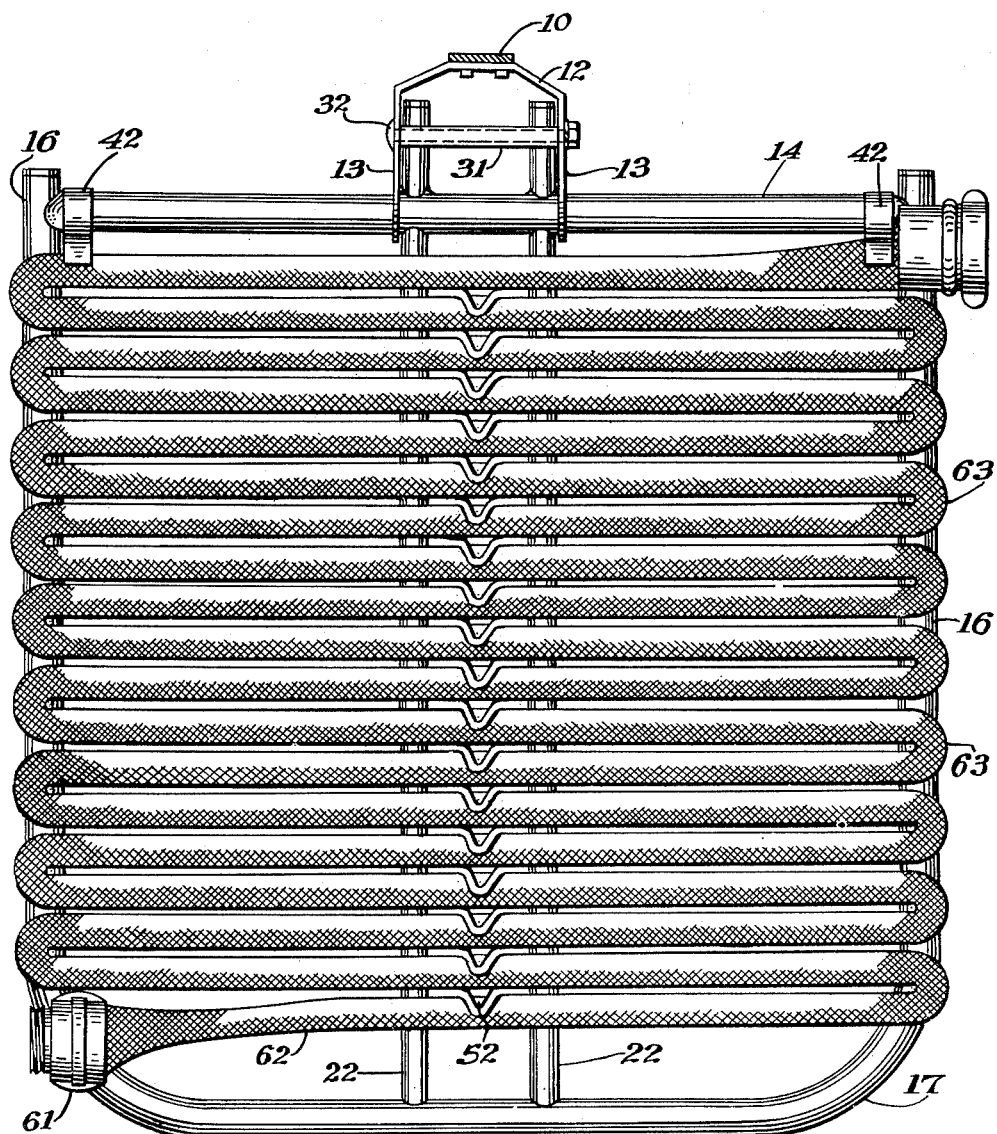
Fig. 1 is a plane view of the improved rack with the hose in place and the supporting member therefor lowered to a horizontal position, with the wall bracket shown in section.

The improved hose rack is mounted on a wall or the like (not shown) by means of a vertically disposed strap 10 which may be fabricated as indicated at 11 for bolts, screws, or other supporting means. The lower end of the plate 10 is provided with a U-shaped bracket 12 formed of sheet metal which comprises two parallel arms 13 having openings therein to form bearings for a bottom bar 14 rotatable in the arms 13. The bar 14 forms one side of a rectangular frame 15, preferably of light weight tubing; the other three sides of the frame are formed by a section 16 of tubing bent with rounded corners 17. Metal plugs 18 and 19 are inserted in the ends of the tubing sections 14 and 16 respectively, and may be retained therein by brazing or in any other suitable manner. These plugs provide a support for machine screws 21 disposed adjacent the ends of the tubes 16 and are anchored in tapped holes in the plugs 18. The transverse member of the frame and the lower cross member 14 are drilled, adjacent the central portions thereof, for the reception of a pair of parallel bars 22. The upper ends of the bars 22, which are preferably formed of tubing, are seated in the holes 23 in the frame member, and the lower ends of the bars pass through the openings 24 in the base member 14. The lower ends 26 of the bars 22 extend through the cross member 14 and are secured therein by screws 27 seated in plugs 28. The openings 24 are located in the arms 13 so that the bars 22 will maintain the cross rail 14 in centralized relation with the bracket 12. The rack is normally supported in a vertical position, as illustrated in Figs. 3 and 4, when the hose is stored therein. In order to remove the hose from the rack the frame 16 is lowered to the horizontal position illustrated in Figs 1 and 2, and is maintained in this position by engagement of the lower ends 26 of the bars 22 with a cross bar 31 intermediate the arms 13. The cross member 31 may be formed from a section of tubing telescopically engaged with a bolt 32 mounted in openings in the arms 13 adjacent the ends thereof. The rack is normally retained in its vertical position by a spring clip 34 on a bracket 35 secured to the upper end of the plate 10 by screws 36. The bracket embodies a fixed jaw 37 on the outer end thereof and a second jaw 38 of similar form pivoted upon the bracket and urged toward the jaw 37 by a compression spring 39. The hose is mounted in the rack in parallel folds, as shown most clearly in Fig. 1. The bottom fold of the hose is supported by the arms 13 and by brackets 41 extending rearwardly from the cross member 14 at the outer ends thereof. The brackets 41 are formed with upturned ends 42 and are preferably wrapped around the tube 14 and fixed by screws 43.

Figure 2:
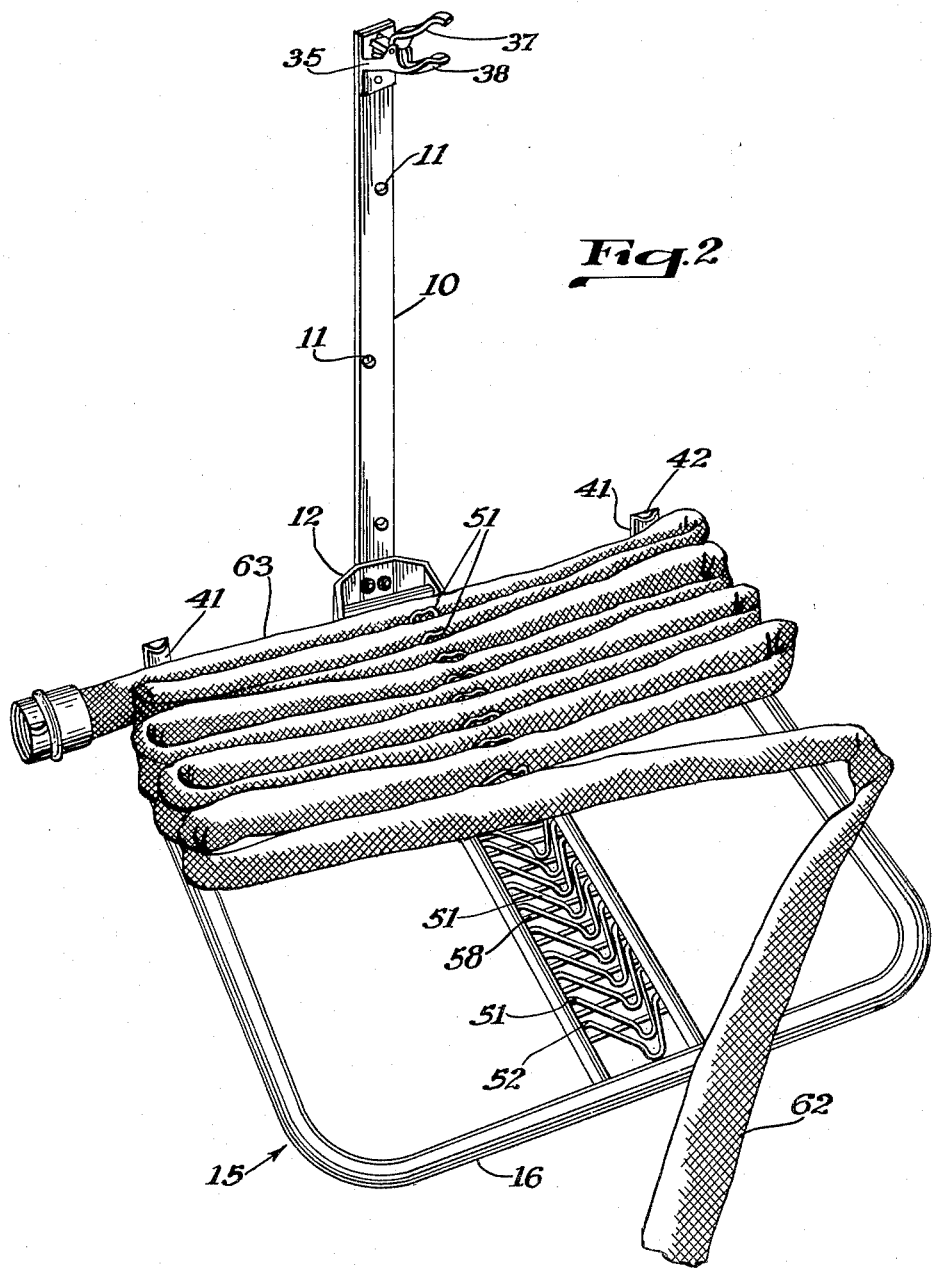
Fig. 2 is a perspective view of the rack with a portion of the hose removed therefrom.

The supporting media for the upper folds of the hose comprise a number of identical brackets 51 mounted in the bars 22 and disposed in normal relation to the plate 10. The brackets 51 are preferably formed of wire bent in V-shape configuration (Fig. 2), the legs 52 thereof having lateral end portions 53 thereon which are adapted for engagement in holes 54 drilled in the side rails of the bars 22. The apex 56 of each V bracket is bent upwardly to overlie the lower edge of the hose when the supporting frame is in its vertical position and to cause all the folded hose sections to be placed in horizontal position simultaneously when the frame is lowered and the hose is to be drawn therefrom. Any desired number of brackets may be provided and each is freely rotatable within the bearing seats 54 therefor. The brackets 51 may be mounted on the parallel bars 22 by springing the legs toward each other, inserting the free ends thereof into the seats, then releasing the compressive effort applied thereon. The brackets are normally supported in a horizontal position by transverse wires 58 inserted in holes 59 in the bars 22, the holes 59 being disposed in offset relation to the holes 54. The supporting frame 15 is normally vertical, as illustrated in Figs. 3 and 4, and the brackets 51 extend horizontally therewith the hose folded back and forth upon itself, as illustrated in Fig. 1, with the central portion of each fold supported on one of the brackets 51. The folds should occur adjacent to or slightly beyond the vertical members 16 so that the central body of the hose will be adequately supported when the frame 15 is adjusted in its horizontal position (Figs. 1 and 2).

To remove the hose, the clip 34 is first released, then the frame 15 is lowered, or allowed to drop, to its horizontal position. The hose may then be pulled from the free end of the frame with each fold following the other in sequential order. As the hose is withdrawn from the frame the brackets 51 will swing downwardly until the movement thereof is arrested by the stop 58. Since the brackets are mounted for free swinging movement, no material resistance will be offered in the release of the hose.

When it is desired to replace the hose, the body thereof may be folded as it is laid upon the frame 15, each bracket 51 being elevated as the successive folds are formed. When the entire hose has been assembled the frame 15 may be raised to a vertical position and secured by the spring clip 34.

An important advantage of the invention resides in the arrangement of the brackets 51 which, as pointed out above, are disposed to support the central portions of the parallel strands of the hose in spaced relation with each other and thus avoid intimate contact between the contiguous layers and pressure upon the bent portions thereof. The drying of the hose is thus expedited and promoted, and the life thereof increased, by elimination of surface contact between the layers of the hose. It has been found by experience with previously known hose supports in which the folds of hose were formed with sharp bends, or in which the weight of the hose was imposed upon the bends, that failure would frequently occur under fire pressure applications.

Another important advantage is that the device moves the racked hose from a vertical to a horizontal position in one movement. This facilitates full inspection of the hose without the labor of removing it from the racks, as is necessary with the usual racks. As a result, there is less tendency to neglect this important phase of fire protection.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A support for a hose or the like adapted to support the hose in a plurality of accordion folds, one above another, and to promote orderly removal of the hose, comprising a strap affixed to a wall of a building structure, a normally upright frame thereon adapted to abut one side of the folds of hose and supporting means for each fold of the hose extending laterally from the frame when the frame is in its normal position, the supporting means being disposed at the central part of the fold, and being mounted so as to swing freely toward the plane of the frame to facilitate sliding of the hose from the frame.

2. A support for a hose or the like adapted to support the hose in a plurality of accordion folds, one above another, and to promote orderly removal of the hose, comprising a strap secured to a wall, a normally upright frame thereon adapted to abut one side of the folds of hose and rotatable to a flat position, the frame being formed to support the hose folds and constitute a shelf from which the hose may be pulled when in the flat position and supporting means for each fold of the hose extending laterally from the frame when the frame is in its normal position, the supporting means being disposed at the central part of the fold, and being mounted so as to swing freely toward the plane of the frame to facilitate sliding of the hose from the frame.

3. A support for a hose or the like adapted to support the hose in a plurality of accordion folds, one above another, and to promote orderly removal of the hose, comprising a strap secured to a wall, a normally upright frame mounted thereon and adapted to abut one side of the folds of hose and rotatable to a flat position, the frame being formed to support the hose folds and constitute a shelf from which the hose may be pulled when in the flat position, supporting means for each fold of the hose extending laterally from the frame when the frame is in its normal position, the supporting means being disposed at the central part of the fold, and being mounted so as to swing freely toward the plane of the frame to facilitate sliding of the hose from the frame, and means for retaining the frame in either of the two said positions.

4. A support for a hose or the like adapted to support the hose in a plurality of accordion folds and to promote orderly removal of the hose, comprising a bar affixed to a wall, a frame thereon adapted to abut one side of the folds when in a flat position, the frame being formed to support the hose folds in the flat position and constitute a shelf from which the hose may be pulled when in the flat position and separating means for each fold of the hose projecting from the frame, the separating means being disposed at the central part of the fold, and being mounted so as to swing freely toward the plane of the frame to facilitate sliding of the hose from the frame.

5. A support for a hose or the like comprising a frame, means pivotally supporting the frame for movement between a normal upright position and a delivery position in which the frame is approximately horizontal, a central frame portion extending generally normal to the axis about which the frame is pivoted, and a series of hose-supporting brackets pivoted on the said central portion and normally extending outwardly therefrom in the normal position of the frame and upwardly in the delivery position, the brackets being swingable toward the said portion in the delivery position.

6. A support for a hose or the like comprising a frame including top, bottom, and side members, means pivotally supporting the frame for movement between a normal position in which the sides are upright and a delivery position in which the frame is approximately horizontal, a frame portion extending between the top and bottom members intermediate the side members, and a series of hose-supporting brackets pivoted on the said portion and normally extending outwardly therefrom in the normal position of the frame and upwardly in the delivery position, the brackets being swingable away from the bottom member.

7. A support for a hose or the like comprising a frame including top, bottom, and side members, means pivotally supporting the frame for movement between a normal position in which the sides are upright and a delivery position in which the frame is approximately horizontal, a frame portion extending between the top and bottom members intermediate the side members, a series of hose-supporting brackets pivoted on the said portion and normally extending outwardly therefrom in the normal position of the frame and upwardly in the delivery position, the brackets being swingable away from the bottom member, means for retaining the frame in the normal position, and means for retaining the frame in the delivery position.

FLOYD J. LEE.

REFERENCES CITED

The following references are of record in the file of this patent:

UNITED STATES PATENTS

| Number | Name | Date |
|---|---|---|
| 846,713 | Wright | Mar. 12, 1907 |
| 1,471,499 | McClintock | Oct. 23, 1923 |
| 2,222,831 | Bitney | Nov. 26, 1940 |